(12) United States Patent
Engel et al.

(10) Patent No.: US 10,586,553 B2
(45) Date of Patent: Mar. 10, 2020

(54) PROCESSING HIGH-DEFINITION AUDIO DATA

(71) Applicant: DOLBY LABORATORIES LICENSING CORPORATION, San Francisco, CA (US)

(72) Inventors: Nicholas L. Engel, Darlinghurst (AU); Nicholas Luke Appleton, Bellevue Hill (AU); Alan J. Seefeldt, Alameda, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/747,735

(22) PCT Filed: Sep. 21, 2016

(86) PCT No.: PCT/US2016/052913
§ 371 (c)(1),
(2) Date: Jan. 25, 2018

(87) PCT Pub. No.: WO2017/053447
PCT Pub. Date: Mar. 30, 2017

(65) Prior Publication Data
US 2018/0211682 A1    Jul. 26, 2018

Related U.S. Application Data

(60) Provisional application No. 62/232,557, filed on Sep. 25, 2015.

(30) Foreign Application Priority Data

Oct. 28, 2015 (EP) .................................... 15191932

(51) Int. Cl.
*G10L 21/0272*    (2013.01)
*G10L 21/02*    (2013.01)
(Continued)

(52) U.S. Cl.
CPC .......... *G10L 21/0272* (2013.01); *G10L 21/02* (2013.01); *G10L 21/0205* (2013.01);
(Continued)

(58) Field of Classification Search
CPC . G10L 21/038; G10L 19/008; G10L 19/0204; G10L 19/0208; G10L 19/025;
(Continued)

(56) References Cited

U.S. PATENT DOCUMENTS 5,267,095 A    11/1993    Hasegawa
5,848,164 A *  12/1998    Levine ................... H04B 1/665
                                                                381/61

(Continued)

FOREIGN PATENT DOCUMENTS

CN    1357136    7/2002
CN    1848242    10/2006
(Continued)

OTHER PUBLICATIONS

Bai, M.R. et al "Development and Implementation of Cross-Talk Cancellation System in Spatial Audio Reproduction Based on Subband Filtering" Journal of Sound and Vibration, Mar. 7, 2006, pp. 1269-1289.

(Continued)

*Primary Examiner* — Duc Nguyen
*Assistant Examiner* — Alexander L Eljaiek

(57) ABSTRACT

In an apparatus configured to perform signal processing on audio data of a first sampling rate, methods disclosed herein comprise receiving audio data of a second sampling rate, the second sampling rate being higher than the first sampling rate. The methods comprise applying filtering to the audio data of the second sampling rate to thereby produce first filtered audio data and second filtered audio data, the first filtered audio data comprising mainly component frequen-
(Continued)

cies which are audible to the human ear, the second filtered audio data comprising mainly components frequencies which are substantially inaudible to the human ear. The methods further comprise applying first signal processing to the first filtered audio data; and applying second signal processing to the second filtered audio data, the second signal processing having a lower computational complexity than the first signal processing. Corresponding apparatus and computer readable media are also disclosed herein.

15 Claims, 5 Drawing Sheets

(51) Int. Cl.
*H04S 3/00* (2006.01)
*H04R 3/00* (2006.01)
*H04S 7/00* (2006.01)
*G11B 20/10* (2006.01)

(52) U.S. Cl.
CPC .......... *G11B 20/10046* (2013.01); *H04R 3/00* (2013.01); *H04R 2430/01* (2013.01); *H04S 3/008* (2013.01); *H04S 7/00* (2013.01); *H04S 2400/03* (2013.01); *H04S 2420/07* (2013.01)

(58) Field of Classification Search
CPC . G10L 21/02; G10L 21/0205; G10L 21/0272; G10L 21/04; G10L 25/78; H04S 3/008; H04S 2400/01; H04S 2400/03; H04S 2420/01; H04S 2420/07; H04S 3/004; H04S 7/00; H04S 7/305; G11B 20/10046; H04R 2430/01; H04R 3/00
USPC ....... 381/22, 309, 310, 56; 700/94; 704/201, 704/205, 229, 500, 501, 503, E19.019
See application file for complete search history.

(56) References Cited

U.S. PATENT DOCUMENTS

| | | | |
|---|---|---|---|
| 5,974,380 A * | 10/1999 | Smyth | G10L 19/0208 704/229 |
| 6,741,706 B1 | 5/2004 | McGrath | |
| 7,685,218 B2 | 3/2010 | McGrath | |
| 8,554,349 B2 | 10/2013 | Hashimoto | |
| 8,600,737 B2 | 12/2013 | Yang | |
| 2007/0288235 A1 * | 12/2007 | Vaananen | H04S 1/007 704/229 |
| 2008/0033730 A1 * | 2/2008 | Jot | G10L 19/0204 704/500 |
| 2013/0051571 A1 | 2/2013 | Nagel | |

FOREIGN PATENT DOCUMENTS

| | | |
|---|---|---|
| CN | 1954366 | 4/2007 |
| CN | 101872618 | 10/2010 |
| JP | 2-945724 | 9/1999 |
| JP | 2005-341204 | 12/2005 |
| WO | 2009/076871 | 6/2009 |

OTHER PUBLICATIONS

Gallo, E. et al "Prioritizing Signals for Selective Real-Time Audio Processing" International Conference on Auditory Display, Jul. 6, 2005, pp. ICAD05-1-7.

ATSC Standard, "Digital Audio Compression Standard" Revision B, document A/52B, Jun. 14, 2005.

ISO/IEC 13818-7, "Advanced Audio Coding".

ISO/IEC 14496-3, "Coding of Audio-visual Object—Part 3: Audio".

* cited by examiner

PROCESSING HIGH-DEFINITION AUDIO DATA

CROSS-REFERENCE TO RELATED APPLICATION

This application claims the benefit of U.S. Provisional Application No. 62/232,557, filed Sep. 25, 2015 and claims priority to European Patent Application No. 15191932.1, filed Oct. 28, 2015, both of which are incorporated by references in their entirety.

TECHNICAL FIELD

The disclosure herein generally relates to methods, in an apparatus configured to perform signal processing on audio data of a first sampling rate, of performing signal processing on audio data of a second (higher) sampling rate.

BACKGROUND

It is common to perform signal processing such as post processing on audio data. For example, an audio-player application running on a personal computer (PC) may perform various post processing operations, such as dialog enhancement, volume levelling, equalization, virtualization, virtual bass, etc., on audio data that it receives from a source, e.g., from a CD-ROM, from a Blu-ray disc, streamed over the Internet, etc.

Traditionally, audio data from such sources tends to have been generated at a sampling rate of e.g. 44.1 kHz or 48 kHz. More recently, however, higher sampling rates such as 192 kHz have become more popular, even in consumer hardware; audio data generated at these higher sampling rates is sometimes called high-definition audio data.

For audio post processing, a move to higher sampling rates means an increase in computational burden. For example, adapting existing audio post processing algorithms to support higher sampling rates may entail updating the underlying algorithms, e.g. by including new coefficient tables, widening signal paths and, in some cases, changing the underlying algorithms to resolve numerical accuracy issues.

BRIEF DESCRIPTION OF THE DRAWINGS

Example embodiments will now be described with reference to the accompanying drawings, in which.

All of the Figures are schematic and generally only show parts which are necessary in order to elucidate the disclosure, whereas other parts may be omitted or merely suggested. Unless otherwise indicated, like reference numerals refer to like parts in different Figures.

DETAILED DESCRIPTION

Figure 1:
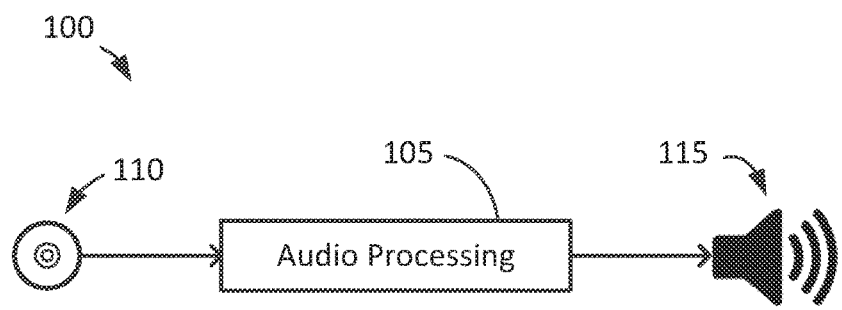
FIG. 1 is a schematic diagram showing a system comprising an apparatus configured to perform audio post processing on audio data it receives from a source.

In view of the above it is an object, inter alia, to enable audio processing at higher sampling rates, such as high-definition audio data sampling rates, without overly increasing the computational burden associated with the audio post processing.

A. OVERVIEW

One aspect of the present disclosure provides a method in an apparatus. The apparatus is configured to perform signal processing on audio data of a first sampling rate. The method comprises receiving audio data of a second sampling rate, the second sampling rate being higher than the first sampling rate; applying filtering to the second-sampling-rate audio data to thereby produce first frequency-domain audio data and second frequency-domain audio data, the first frequency-domain audio data comprising mainly component frequencies which are audible to the human ear, the second frequency-domain audio data comprising mainly components frequencies which are substantially inaudible to the human ear; applying first signal processing to the first frequency-domain audio data; and applying second signal processing to the second frequency-domain audio data, the second signal processing having a lower computational complexity than the first signal processing.

The method enables the apparatus to perform audio processing at higher sampling rates, such as said second sampling rate, without overly increasing the associated computational burden. More specifically, the method applies signal processing of a lower computational complexity to component frequencies which are substantially inaudible to the human ear. The inventors recognized that, in order to reduce overall computational complexity, a lesser signal processing performance can be tolerated (and in principle should be imperceptible) for substantially inaudible component frequencies.

Optionally, said applying first signal processing to the first filtered audio data makes use of at least one existing process or step of the signal processing performed on the audio data of the first sampling rate.

The ability to reuse at least one existing process or step may result in reliable and simpler implementation, by (at least partially) avoiding the redesign of components, and by permitting the use of "tried and tested" components.

Optionally, the apparatus is configured to use a filter bank to convert the audio data of the first sampling rate into the frequency domain before performing the signal processing on it, and wherein said applying filtering to the secondsampling-rate audio data comprises applying an adapted version of the filter bank to the second-sampling-rate audio data.

Adapting a common filter bank may be more efficient than e.g. using different filter banks; for example, it may result in a reduced memory footprint. Also, since different filters tend have different attributes, using a common filter bank may lead to more consistency between the first-sampling-rate frequency domain data and the second-sampling-rate frequency domain data.

Optionally, the filter bank generates a first number of bands of frequency data and the adapted version thereof generates a second number of bands of frequency data, the second number being higher than the first number, the ratio of the first number to the second number being the same as the ratio of the first sampling rate to the second sampling rate. Optionally, all of the bands of frequency data have substantially the same bandwidth.

Optionally, said second signal processing comprises applying a dynamic gain based on a dynamic gain of the first signal processing.

The inventors recognized that, if the first signal processing introduces a dynamic gain, then applying a corresponding dynamic gain as part of the second signal processing may lead to a more "natural" spectral envelope after combining the first and second filtered data.

Optionally, said second signal processing comprises a computationally-simpler version of a step or process of said first signal processing.

Optionally, said applying first signal processing comprises applying at least one of: dialog enhancement, volume levelling or equalization. Optionally, said applying second signal processing comprises applying none of: dialog enhancement, volume levelling or equalization.

Optionally, said applying second signal processing to the second filtered audio data comprises time-domain signal processing of the second filtered audio data.

Optionally, the first sampling rate is 44.1 kHz and the second sampling rate is one of 88.2 kHz (i.e., a factor of two higher) or 176.4 kHz (i.e., a factor of four higher). Optionally, the first sampling rate is 48 kHz and the second sampling rate is one of 96 kHz (i.e., a factor of two higher) or 192 kHz (i.e., a factor of four higher).

Optionally, the second signal processing comprises introducing a delay to compensate for a delay introduced by the first signal processing.

A further aspect of the present disclosure provides an apparatus. The apparatus comprises an input for receiving audio data of a first sampling rate and audio data of a second sampling rate; and a logic system configured to perform the aforementioned method, with or without any one or more of the optional features discussed above.

A yet further aspect of the present disclosure provides a computer readable medium comprising instructions, which, when executed by a logic system, configure the logic system to perform a method according to any one of claims 1 to 12.

B. EXAMPLE EMBODIMENTS

Figure 4:
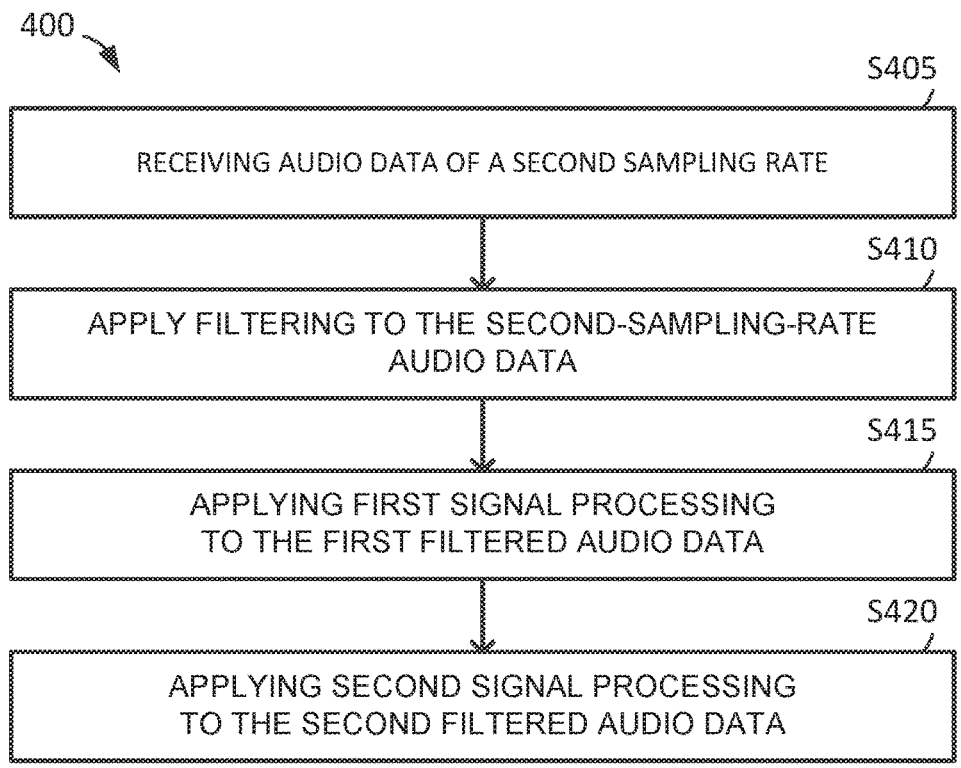
FIG. 4 is a schematic diagram showing some of the main steps of a class of methods performed by the apparatus shown in FIG. 1.
Figure 5:
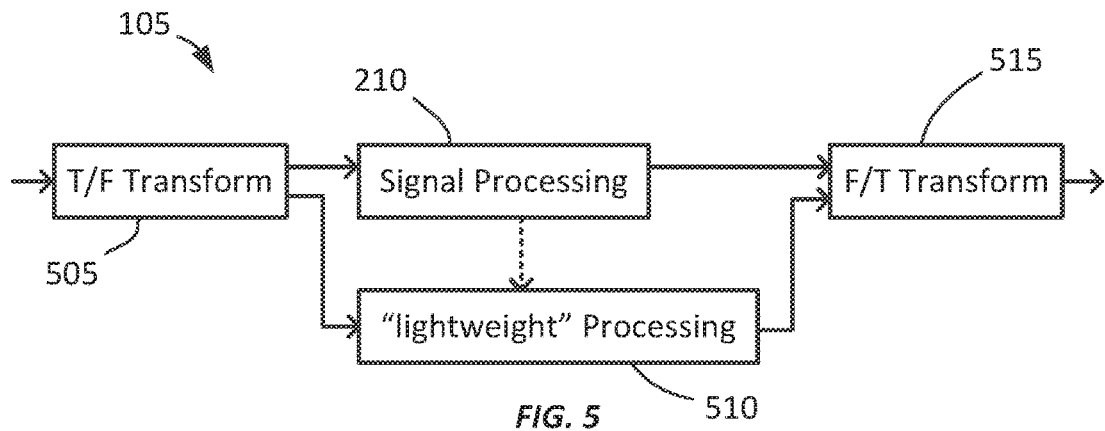
FIG. 5 is a schematic diagram showing some of the main components of the audio post processing shown in FIG. 1, when performed on audio data generated at higher sampling rates, e.g. 192 kHz, according to a first embodiment of the present disclosure.
Figure 7:
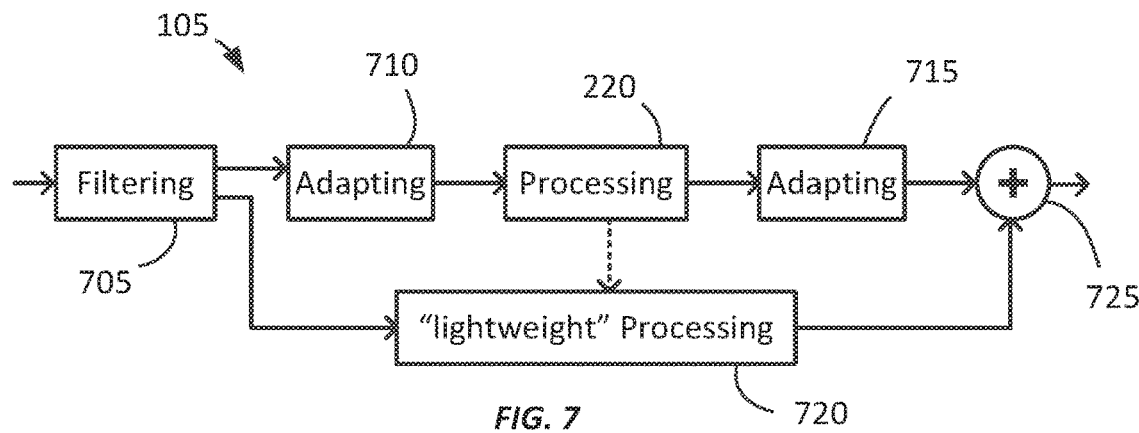
FIG. 7 is a schematic diagram showing some of the main components of the audio post processing shown in FIG. 1, when performed on audio data generated at higher sampling rates, e.g. 192 kHz, according to a second embodiment of the present disclosure.
Figure 6:
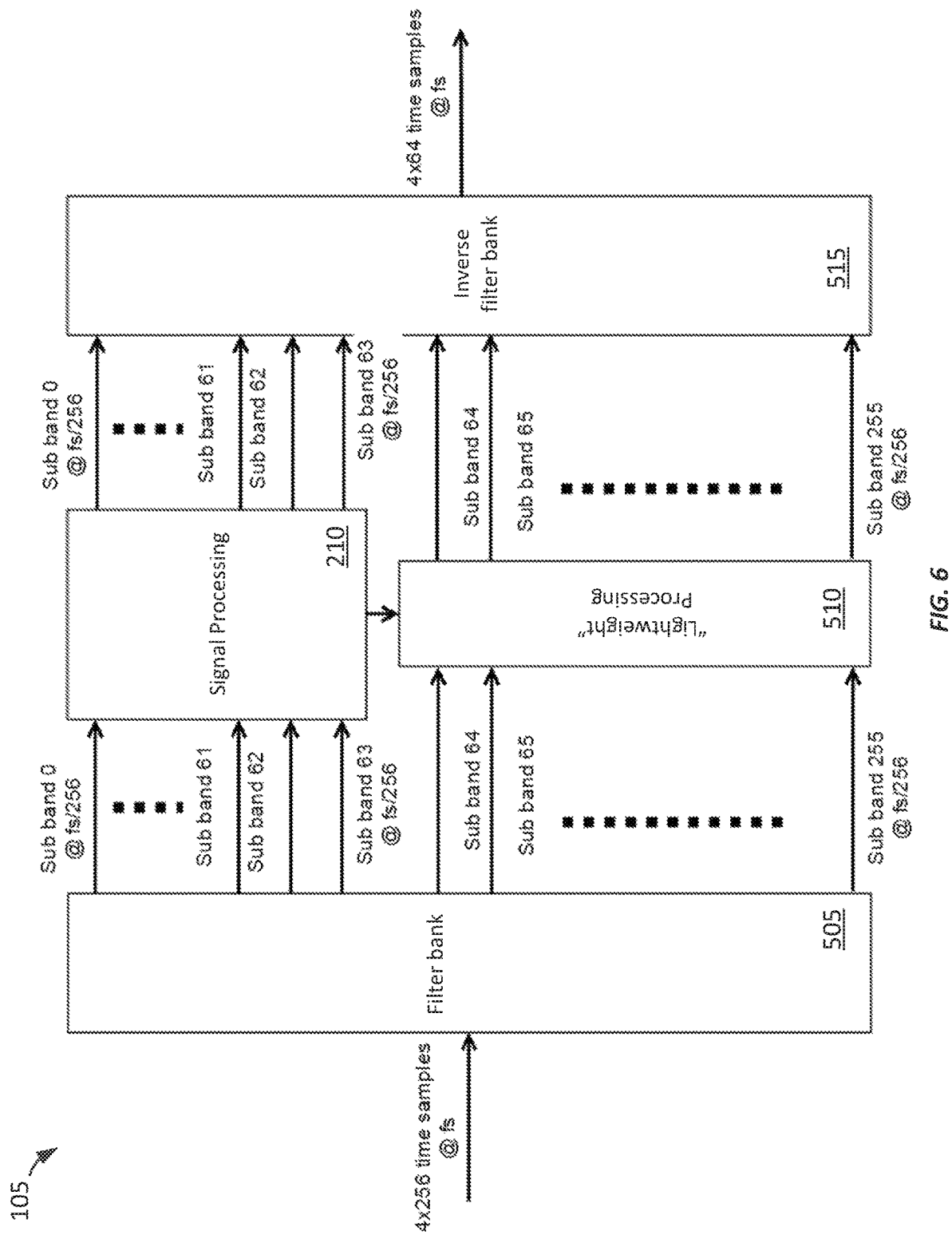
FIG. 6 is a schematic diagram showing additional details of the main components shown in FIG. 5.
Figure 8:
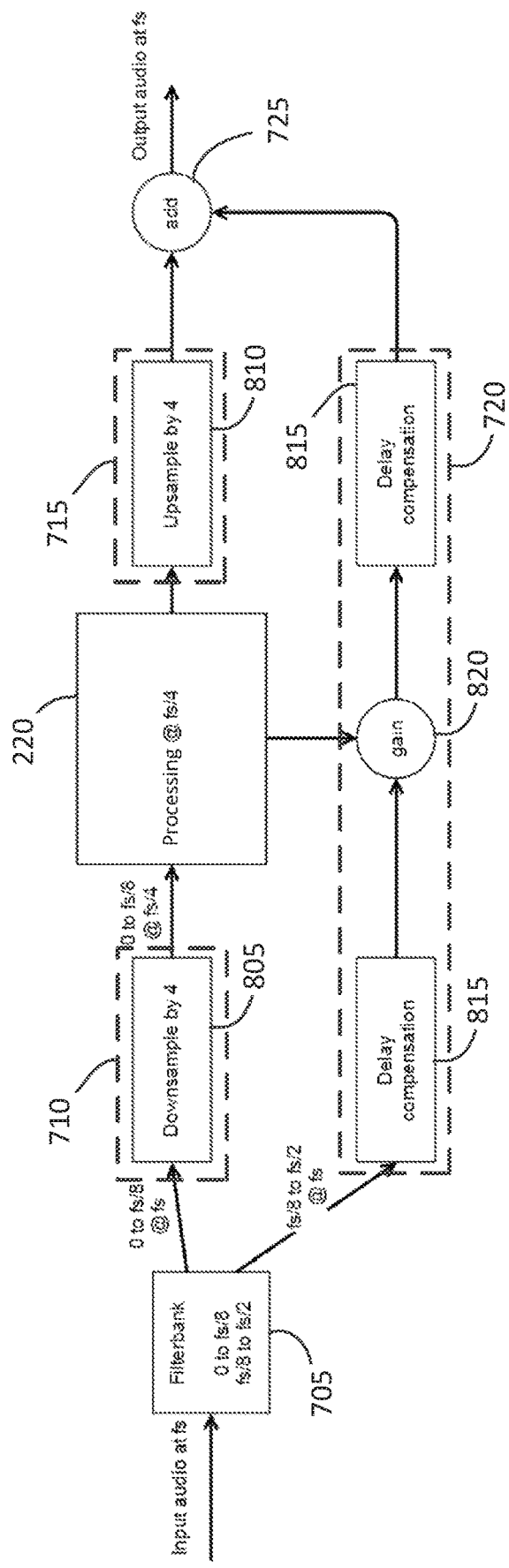
FIG. 8 is a schematic diagram showing additional details of the main components shown in FIG. 7.

In the accompanying drawings, details of a first embodiment are shown in FIGS. 5 and 6, and details of a second embodiment are shown in FIGS. 7 and 8. FIGS. 1 to 4 and 9 show architectural and implementation details which are common to both the first embodiment and the second embodiment.

B.1. Overview of First and Second Embodiments

Referring to FIG. 1, in the first and second embodiments, a system 100 comprises an apparatus 105 configured to perform signal processing on audio data received, via an input of the apparatus 105, from a source 110. The apparatus 105 is further configured to render the audio data for playback via one or more loudspeakers 115 of the system 100.

The apparatus 105 may be, for example, a personal computer (PC), a tablet computer, a mobile telephone, a conference telephone, a television set-top box, or the like. Other suitable apparatuses will be readily apparent to those of ordinary skill in the art.

The source 110 may be, for example, a CD-ROM, a Blu-ray disc, read-only memory, flash memory, etc., or for example, apparatus from a content distribution network, e.g. a computer server connected via the Internet. Other suitable sources will be readily apparent to those of ordinary skill in the art.

The one or more loudspeakers 115 may be, for example, headphones, earphones, or the like, or for example freestanding loudspeakers, perhaps in a surround sound arrangement, a sound bar, loudspeakers of a television, or the like. The one or more loudspeakers 115 may be connected directly to the apparatus 105, or connected via an intermediate device such as an audio video receiver (AVR). Other suitable loudspeakers will be readily apparent to those of ordinary skill in the art.

The audio data may be received in an encoded bit stream comprising the audio data and typically some metadata. The encoded bit stream may be a bit stream generated by an encoding process which complies with a published standard such as "Digital Audio Compression Standard (AC-3, E-AC-3)," Revision B, Document A/52B, 14 Jun. 2005 published by the Advanced Television Systems Committee, Inc. (referred to herein as the "ATSC Standard"), and in ISO/IEC 13818-7, Advanced Audio Coding (AAC) (referred to herein as the "MPEG-2 AAC Standard") and ISO/IEC 14496-3, subpart 4 (referred to herein as the "MPEG-4 Audio Standard") published by the International Standards Organization (ISO). The encoding and decoding processes that conform to these standards are mentioned only as examples. Principles of the present disclosure may be used with coding systems that conform to other standards as well.

Figure 2:
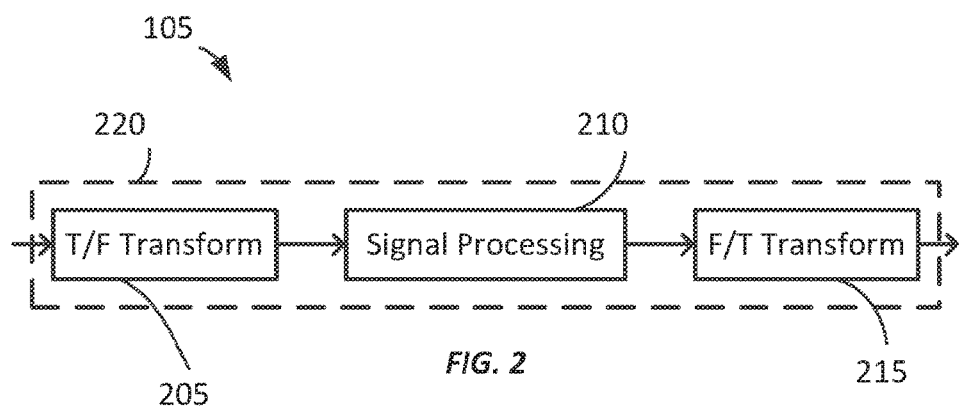
FIG. 2 is a schematic diagram showing some of the main components of the audio post processing shown in FIG. 1, when performed on audio data generated at lower sampling rates, e.g. 44.1 kHz or 48 kHz.

Referring to FIG. 2, in the first and second embodiments, a time- to frequency-domain transform module 205 of the apparatus 105 receives time-domain (e.g., pulse code modulated) audio data of a first sampling rate, e.g. 44.1 kHz or 48 kHz, and generates therefrom corresponding frequency-domain audio data. A signal processing module 210 of the apparatus 105 receives the frequency-domain audio data and generates therefrom corresponding processed audio data. A frequency- to time-domain transform module 215 of the apparatus 105 receives the processed audio data and generates therefrom corresponding time-domain processed audio data. This is illustrated in more detail in FIG. 3. Together, the transform module 205, the signal processing module 210 and the transform module 215 will be referred to herein as an audio processing module 220.

Figure 3:
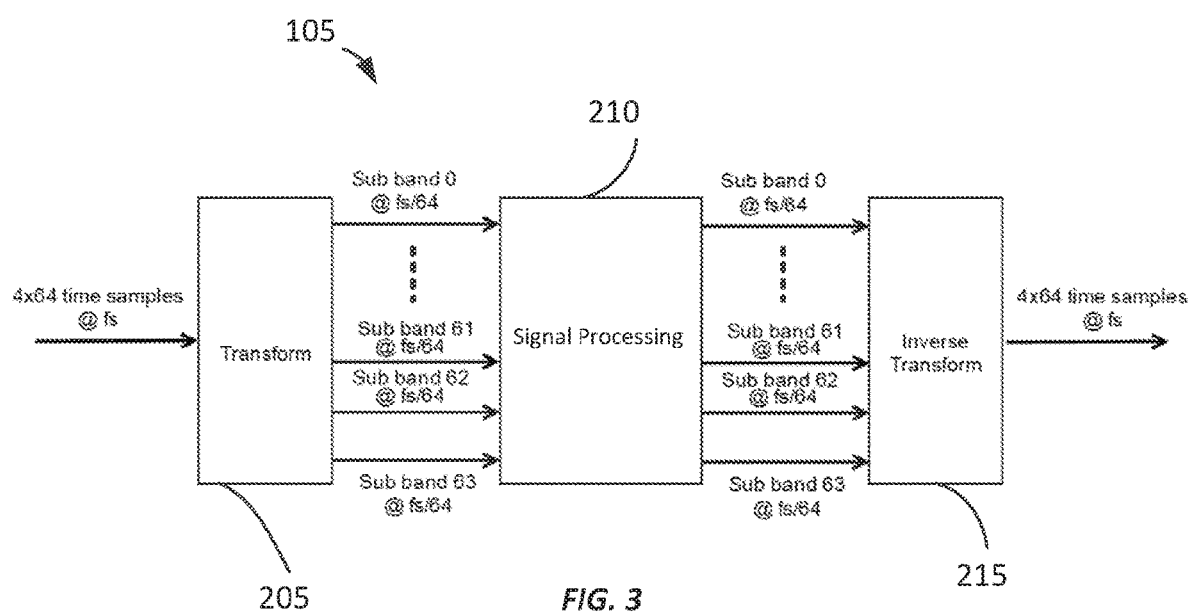
FIG. 3 is a schematic diagram showing additional details of the main components shown in FIG. 2.

Referring to FIG. 3, in the first and second embodiments, the time- to frequency-domain transform module 205 is a uniform modulated filter bank. Suitable choices of type of uniform modulated filter bank include, but are not limited to, modulated complex lapped transform filter banks, discrete Fourier transform filter banks, and the like.

As can be seen in FIG. 3, the time-domain audio data received by the uniform modulated filter bank 205 arrives in blocks of 64 time samples, at the first sampling rate, which is 44.1 kHz or 48 kHz (in FIG. 3, $f_s$=44.1 kHz or $f_s$=48 kHz). For example, the uniform modulated filter bank 205 may receive 4 blocks of 64 time samples at a time. The corresponding frequency-domain audio data generated by the uniform modulated filter bank 205 consists of 64 distinct bands of frequency-domain audio data, each at a sampling rate of the first sampling rate divided by 64, i.e. 689.0625 Hz or 750 Hz. It will be appreciated that the number of time samples, the number of blocks of time samples and the number of distinct bands of frequency-domain audio data are given by way of example only.

The signal processing module 210 is configured to receive the frequency-domain audio data in this format, i.e. 64 distinct sub-bands of frequency-domain audio data, each at a sampling rate of 689.0625 Hz or 750 Hz. The processed audio data generated by the signal processing module 210 is in the same format as the frequency-domain audio data received by the signal processing module 210.

The signal processing module 210 is configured to perform various state-of-the-art (known) signal processing operations which are configured based on the format of the frequency-domain audio data received by the signal processing module 210. For example, the signal processing module 210 may be configured to perform headphone-virtualization processing, using coefficients intended specifically for the frequency-domain audio data in this format. The signal processing module 210 may also be configured to perform any one or more of: dialogue enhancement, volume levelling, equalization, headphones virtualization, down mixing, mixing, virtual bass or the like.

The frequency- to time-domain transform module 215 is an inverse filter bank, i.e. the inverse of the uniform modulated filter bank 205.

The foregoing description of the first and second embodiments, and variants thereof, discusses processing performed by the apparatus 105 when receiving audio data of a first sampling rate, the first sampling rate being 44.1 kHz or 48 kHz in the specific examples discussed above. This processing per se is known, and is summarized hereinabove for context and to provide a better understanding of the novel features of the embodiments disclosed herein.

We turn now to discussion of processing performed by the apparatus 105 when receiving audio data of a second sampling rate, e.g. 88.2 kHz, 96 kHz, 132.3 kHz, 144 kHz, 176.4 kHz or 192 kHz. The ability to adapt to audio data of the second sampling rate, as well as the manner in which the apparatus 105 processes the audio data of the second sampling rate, are believed to be novel. FIG. 4 schematically shows the main steps of a method 400 performed by the apparatus 105, in both the first and the second embodiments, when it receives audio data of the second sampling rate.

Referring to FIG. 4, in the first and second embodiments, the method 400 comprises, at step S405, receiving audio data of the second sampling rate. The second sampling rate is higher than the first sampling rate. The specific manner in which the apparatus 105 recognizes the sampling rate of the audio data is not essential; the sampling rate may for example be indicated in accompanying metadata, or it may for example be determined from an analysis of the audio data as such.

The method 400 comprises, at step S410, applying filtering to the second-sampling-rate audio data to thereby produce first filtered audio data and second filtered audio data. The first filtered audio data comprises mainly component frequencies in the range 0 kHz to 24 kHz; in this embodiment, in the first filtered audio data, component frequencies outside said range are highly attenuated. The second filtered audio data comprises mainly components frequencies in the range 24 kHz and above, which are frequencies that are substantially inaudible to the human ear; in this embodiment, in the second filtered audio data, component frequencies outside said range are highly attenuated.

The method 400 comprises, at step S415, applying first signal processing to the first filtered audio data. Typically, applying the first signal processing makes use of at least one existing process or step of the signal processing performed on the audio data of the first sampling rate. In the first and second embodiments, said first signal processing comprises substantially the same signal processing as is performed by the signal processing module 210 on audio data of the first sampling rate.

The method 400 comprises, at step S420, applying second signal processing to the second filtered audio data, the second signal processing having a lower computational complexity than the first signal processing. That is, relatively "lightweight" signal processing is performed on component frequencies that are substantially inaudible to human ear.

B.2. Details of First Embodiment

Referring to FIG. 5, in the first embodiment, it is a time-to frequency-domain transform module 505 of the apparatus 105 which receives the time-domain audio data of the second sampling rate, in step S405.

Further, it is the time- to frequency-domain transform module 505 which applies the filtering to the second-sampling-rate audio data, in step S410. The filtering applied in step S410 is different from that which is applied to the first-sampling-rate audio data by the time- to frequency-domain transform module 205. However, module 505 is an adapted version of module 205, as will be described in more detail below with reference to FIG. 6.

It is the signal processing module 210 which, at step S415, applies the first signal processing to the first filtered audio data. The first signal processing is not substantially different from what is performed on the first-sampling-rate audio data by the signal processing module 210, as described above, in Section B.1.

It is an additional processing module 510 which, in the first embodiment, at step S420, applies the second signal processing to the second filtered audio data. The second signal processing has a lower computational complexity than the first signal processing, as will be described in more detail below with reference to FIG. 6.

In the first embodiment, a frequency- to time-domain transform module 515 of the apparatus 105 receives the processed first filtered audio data from signal processing module 210 and the processed second filtered audio data from the additional processing module 510, which, together, it transforms back into the time domain using a transform which is the inverse of the transform used in the time- to frequency-domain transform module 505.

Referring to FIG. 6, in the first embodiment, the transform module 505 is an adapted version of the transform module 205. Like the transform module 205, the transform module 505 is a uniform modulated filter bank; suitable choices of filter bank type include those listed above with reference to the transform module 205.

The transform module 505 is an adapted version of the transform module 205 in at least the sense that it produces a larger number of bands of frequency data. As a person of ordinary skill in the art will appreciate, in order to produce a larger number of bands of frequency data, the transform module 505 comprises more filters than the transform module 205 comprises. Specifically, in the present embodiment, the transform module 205 and the transform module 505 are uniform modulated filter banks having the same prototype filter; the transform module 505 has more "modulations" of the prototype filter than the transform module 205 has.

The time-domain audio data received by the uniform modulated filter bank 505 arrives in blocks of 256 time samples, at the second sampling rate, which is 176.4 kHz or 192 kHz in this embodiment. It will be appreciated that this is four times as many time samples as are received by the uniform modulated filter bank 205 when receiving the time-domain audio data of the first sampling rate.

The corresponding frequency-domain audio data generated by the uniform modulated filter bank 505 consists of 256 distinct bands (also known as bins) of frequency-domain audio data, each at a sampling rate of the second sampling rate divided by 256, i.e. 689.0625 Hz or 750 Hz (which is the same as the sampling rates of the bands of frequency-domain audio data described with reference to FIG. 3). As a person of ordinary skill in the art will appreciate that, in order to produce frequency-domain audio data at a sampling rate of the second sampling rate divided by a given factor, say a factor of 256, the uniform modulated filter bank is configured to perform decimation downstream of the filters. In other words, in the transform module 205 and the transform module 505, the uniform modulated filter banks are decimated filter banks, with the decimation factor of the transform module 505 being higher than that of the transform module 205.

The bands are contiguous and of equal width, covering the frequency range 0 Hz to 88.2 kHz when the second sampling rate is 176.4 kHz, or 0 Hz to 96 kHz when the second sampling rate is 192 kHz.

It will be appreciated that the number of time samples, the number of blocks of time samples and the number of distinct bands of frequency-domain audio data are given by way of example only.

It will be appreciated that in this embodiment there is a factor-of-four increase from the first sampling rate to the second sampling rate (i.e., the second sampling rate is four times higher than the first sampling rate), and that there is a corresponding factor-of-four increase in the respective numbers of bands of frequency-domain audio data (i.e., the uniform modulated filter bank 505 generates four times as many bands of frequency-domain audio data as the uniform modulated filter bank 205 generates).

More generally, the uniform modulated filter bank 205 generates a first number of bands of frequency-domain audio data and the uniform modulated filter bank 505 generates a second number of bands of frequency-domain audio data, the second number being higher than the first number, the ratio of the first number to the second number being the same as the ratio of the first sampling rate to the second sampling rate. Consequently, the bandwidth of the individual bands of frequency-domain audio data generated by the uniform modulated filter bank 505 is the same (including having the same center frequencies) as the bandwidth of the individual bands of frequency-domain audio data generated by the uniform modulated filter bank 205. Advantageously, this is achieved in the present embodiment by the inclusion of four times as many filters (specifically, four times as many "modulations" of the (same) prototype filter) in the uniform modulated filter bank 505 as there are in the uniform modulated filter bank 205.

It will be appreciated that in this embodiment there is a factor-of-four increase from the first sampling rate to the second sampling rate (i.e., the second sampling rate is four times higher than the first sampling rate), and that there is a corresponding factor-of-four increase in the number of time samples received by the uniform modulated filter bank 505 (i.e., the uniform modulated filter bank 505 receives four times as many time samples as the uniform modulated filter bank 205 generates).

More generally, the uniform modulated filter bank 205 receives a first number of time samples of time-domain audio data and the uniform modulated filter bank 505 receives a second number of time samples of time-domain audio data, the second number being higher than the first number, the ratio of the first number to the second number being the same as the ratio of the first sampling rate to the second sampling rate. Consequently, the sampling rate of the frequency-domain audio data generated by the uniform modulated filter bank 505 is the same as the sampling rate of the frequency-domain audio data generated by the uniform modulated filter bank 205. Advantageously, this is achieved in the present embodiment by increasing the decimation factor of the uniform modulated filter bank 505 to be four times the decimation factor of the uniform modulated filter bank 205.

As noted above, the signal processing module 210 applies the first signal processing to the first filtered audio data. In this embodiment, the first filtered audio data is made up of the bands 0 to 63 of the frequency-domain audio data generated by the uniform modulated filter bank 505, i.e. the 64 lowest-frequency bands. These bands cover the frequency range 0 to 22.05 kHz when the second sampling rate is 176.4 kHz, or the frequency range 0 to 24 kHz when the sampling rate is 192 kHz. It will be recognized that this is the same number of bands, covering the same frequency range, as the entirety of the frequency-domain audio data generated by the unmodulated filter bank 205 from the time-domain audio data at the first sampling rate.

Furthermore, the sampling rate of the bands 0 to 63 of the frequency-domain audio data generated by the uniform modulated filter bank 505 is the same as the first sampling rate.

Therefore, said first signal processing need not be (and in fact is not) substantially different from what is performed on the first-sampling-rate audio data by the signal processing module 210, as described above, in Section B.1 (i.e., because bands 0 to 63 of the frequency-domain audio data generated by the uniform modulated filter bank 505 are substantially the same as the 64 bands of frequency-domain audio data generated by the uniform modulated filter bank 205, in terms of both sampling rate and bandwidth). Consequently, and advantageously, no substantial changes need be made to the signal processing module 210 in order for it to adapt to the time-domain audio data switching from the first sampling rate to the second sampling rate. For example, no changes are required (or made) to the underlying signal processing algorithms.

As noted above, the additional processing module 510 applies the second signal processing to the second filtered audio data. In this embodiment, the second filtered audio data is made up of bands numeral 64 to 255 of the frequency-domain audio data generated by the uniform modulated filter bank 505, i.e. the 192 highest-frequency bands. These bands cover the frequency range 22.05 kHz to 88.2 kHz when the second sampling rate is 176.4 kHz, or 24 kHz to 96 kHz when the sampling rate is 192 kHz. It will be appreciated that the component frequencies in this range are substantially inaudible to the human ear. (The generally accepted standard range of human-audible frequencies is 20 Hz to 20 kHz.)

The second signal processing is less computationally complex than the first signal processing. In this embodiment, the additional processing module 510 comprises one or more delay compensation modules (not shown) and a gain module (not shown). The purpose of the gain module is to apply to the second filtered audio data a gain which approximates a net gain applied to the first filtered audio data by the signal processing module 210. The purpose of the delay compensation module(s) is to time-align the processed second filtered audio data generated by the additional processing module 510 with the corresponding processed first filtered audio data generated by the signal processing module 210.

Since the net gain applied to the first filtered audio data is dynamic, changing based on an analysis of the audio signal represented by the first filtered audio data, the gain applied to the second filtered audio data by the gain module should change in a corresponding manner; this is achieved through communication between the signal processing module 210 and the additional processing module 510, which will be described in more detail below, in section B.4.

Typically, the net delay introduced by the signal processing module 210 does not vary at run-time, and so the delay(s) introduced by the delay compensation module(s) of the additional processing module 510 need not vary at run-time. Therefore, the signal processing module 210 need not (and does not) communicate its net delay to the additional processing module 510.

The additional processing module 510 may comprise one or more further modules. The, or each, further module may be a computationally-simpler version of a corresponding module in the signal processing module 210, as will be discussed in more detail below, section B.5.

As noted above, the transform module 515 receives the processed first filtered audio data from signal processing module 210 and the processed second filtered audio data from the additional processing module 510 (which, as noted above, is time-aligned with the processed first filtered audio data), i.e., all 256 bands of the processed frequency domain audio data, and transforms it back into the time domain. In this embodiment, the transform module 515 is an inverse filter bank; suitable choices of inverse filter bank type include those described above with reference to the inverse transform module 215.

B.3. Details of Second Embodiment

Referring to FIG. 7, in the second embodiment, it is a filter module 705 of the apparatus 105 which receives the time-domain audio data of the second sampling rate, in step S405.

Further, it is the filter module 705 which applies the filtering to the second-sampling-rate audio data, in step S410. In this embodiment, said filtering is performed in the time domain, by a high-pass filter and a low-pass filter.

(In variants of this embodiment, said filtering may be performed in the frequency domain, and the variants of filter module 705 may or may not transform the filtered audio data back into the time domain.)

A first adapting module 710 receives the first filtered audio data (which was generated by applying a low-pass filter, with a corner frequency of approximately 22.05 kHz or 24 kHz, to the time-domain audio data) from the filter module 705 and adapts it for subsequent processing. Typically, the adapting comprises decimating the first filtered audio data. The result of the adapting is that the adapted first filtered audio data is substantially the same as the time-domain audio data of the first sampling rate, as described above with reference to FIGS. 2 and 3. The adapting performed by the first adapting module 710 will be described in more detail below, with reference to FIG. 8.

(In variants of this embodiment in which the filter module 705 performs filtering in the frequency domain and does not transform the first filtered audio data back into the time domain, the adapting performed by the first adapting module 710 may include transforming the first filtered audio data back into the time domain.)

The audio processing module 220 receives the adapted first filtered audio data from the adapting module 710. Comparing FIGS. 7 and 2, it will be appreciated that the audio processing module 220 comprises the signal processing module 210, the transform module 205 and the inverse transform module 215.

It is the audio processing module 220 which, at step S415, applies the first signal processing to the (adapted) first filtered audio data. Since the (adapted) first filtered audio data is substantially the same as the time-domain audio data of the first sampling rate, the audio processing module 220, at step S420, performs substantially the same processing on the (adapted) first filtered audio data as it does on the time-domain audio data of the first sampling rate. In other words, the first signal processing performed at step S420 does not materially differ from the processing performed by the audio processing module 220 on the time-domain audio data of the first sampling rate; consequently, the audio processing module 220 in this embodiment need not be (and is not) adapted in order for the apparatus 105 to be able to process audio data of the second sampling rate in addition to audio data of the first sampling rate.

A second adapting module 715 receives the processed first filtered audio data from the audio processing module 220. The adapting performed by the second adapting module 715 is the inverse of the adapting performed by the first adapting module 710. The adapting performed by the second adapting module 715 will be described in more detail below with reference to FIG. 8.

An additional processing module 720 receives the second filtered audio data from the filter module 705. In this embodiment, the second filtered audio data was generated by applying a high-pass filter, with a corner frequency of approximately 22.05 kHz or 24 kHz, to the time-domain audio data. It will be appreciated that the component frequencies in the second filtered audio data are substantially inaudible to the human ear.

It is the additional processing module 720 which applies the second signal processing to the second filtered audio data. The second signal processing applied by the additional processing module 720 in this embodiment is generally equivalent to the second signal processing applied by the additional processing module 510 in the first embodiment. Again, the second signal processing is less computationally complex than the first signal processing, as will be described in more detail below with reference to FIG. 8.

A combining module 725 receives the processed first filtered audio data from the second adapting module 715, and the processed second filtered audio data from the additional processing module 720, and combines them into processed time-domain audio data. In this embodiment, the combination is a summation of the respective signals represented by the first and second filtered audio data.

Referring to FIG. 8, the filter module 705 is a filter bank which receives the time-domain audio data of the second sampling rate, which in this embodiment is 176.4 kHz or 192 kHz (in FIG. 8, $f_s$=176.4 kHz or 192 kHz).

The filter module 705 is configured to generate the first filtered audio data by applying to the received time-domain audio data a low-pass filter with a corner frequency of the second sampling rate divided by eight, i.e. 22.05 kHz or 24 kHz in this embodiment. Accordingly, the first filtered audio data comprises component frequencies in the range 0 Hz to 22.05 kHz or 0 Hz to 24 kHz, at the second sampling rate, which in this embodiment is 176.4 kHz or 192 kHz.

The filter module 705 is configured to generate the second filtered audio data by applying to the received time-domain audio data a high-pass filter with a lower corner frequency of the second sampling rate divided by eight, i.e. 22.05 kHz or 24 kHz, and an upper corner frequency of the second sampling rate divided by two, i.e. 88.2 kHz or 96 kHz. Accordingly, the second filtered audio data comprises component frequencies in the range 22.05 kHz to 88.2 kHz or 24 kHz to 96 kHz, at the second sampling rate, which in this embodiment is 176.4 kHz or 192 kHz.

The first adapting module 710 comprises a downsampling module 805. The downsampling module receives the first filtered audio data and downsamples it by a factor of four. Accordingly, the (adapted) first filtered audio data generated by the downsampling module 805 comprises component frequencies in the range 0 Hz to 22.05 kHz or 0 Hz to 24 kHz, at the second sampling rate divided by four, i.e. 44.1 kHz or 48 kHz in this embodiment.

Accordingly, the audio processing module 220 performs its processing at the second sampling rate divided by four, which is the same as the first sampling rate. As noted above, this means the audio processing module 220 in this embodiment need not be (and is not) adapted to cope with a switch from time-domain audio data of the first sampling rate to time-domain audio data of the second sampling rate.

The second adapting module 715 comprises an upsampling module 810. The upsampling module 810 receives the processed first filtered audio data and upsamples it by a factor of four. Accordingly, the (adapted) processed first filtered audio data is returned to the second sampling rate.

The additional processing module 720, which performs the second signal processing on the second filtered audio data, comprises one or more delay compensation modules 815 and a gain module 820.

The purpose of the gain module 820 is to apply to the second filtered audio data a gain which approximates a net gain applied to the first filtered audio data by the audio processing module 220. Since the net gain applied to the first filtered audio data is dynamic (changing based on an analysis of the signal represented by the first filtered audio data), the gain applied to the second filtered audio data by the gain module 820 should change in a corresponding manner; this is achieved through communication between the audio processing module 220 and the additional processing module 720, which will be described in more detail below, in section B.4.

The purpose of the delay compensation modules 815 is to time-align the processed second filtered audio data generated by the additional processing module 720 with the corresponding processed first filtered audio data generated by the audio processing module 220. In other words, the sum of the respective delays introduced by the gain module 820 and the delay compensation modules 815 is the same as the sum of the respective delays introduced by the first adapting module 710, the audio processing module 220 and the second adapting module 715. The audio processing module 220 need not (and does not) communicate its net delay to the additional processing module 720.

The additional processing module 720 may comprise one or more further modules. The or each further module may be a computationally-simpler version of a corresponding module in the signal processing module 210, as will be discussed in more detail below, section B.5.

B.4. Communication Between Processing Paths

In the first and second embodiments, described hereinabove, the signal processing applied by the respective additional processing modules 510, 720 comprises a dynamic gain. The dynamic gain is based on a dynamic gain applied by the signal processing module 210. In particular, the dynamic gain of the additional processing module 510, 720 tracks the dynamic gain of the signal processing module 210 such that, when the processed first filtered data and the processed second filtered data are combined, the combined filtered data has a spectrally-continuous spectral envelope. Consequently, in the frequency domain the combined filtered data does not look obviously different from the result of applying the same signal processing to both the first and the second filtered data.

In the first and second embodiments, the signal processing module 210 is in communication with the additional processing module 510, 720. More specifically, the additional processing module 510, receives a control signal from the signal processing module 210.

The control signal is generated by an analysis module (not shown) of the signal processing module 210. The control signal specifies, in real time, a current value for the dynamic gain of the additional processing module 510, 720. The current value corresponds to a current overall gain value resulting from the net effect of the various processes within the signal processing module 210. For example, the signal processing module 210 may include a volume-levelling process which analyses the audio signal represented by the first filtered audio data, and applies a frequency-dependent gain. The control signal then would specify a current value of the dynamic gain of the additional processing module 510, 720, which takes account of the frequency-dependent gain applied to the first filtered audio data.

B.5. Simplified Processing Modules

In the first and second embodiments, described hereinabove, the respective additional processing modules 510, 720, which each comprise a gain module and one or more delay modules, may each further comprise one or more computationally-simpler versions of corresponding modules in the signal processing module 210. The computationally-simpler modules are configured to perform a step or process which is equivalent to a step or process performed by the respective corresponding modules in the signal processing module 210, but which has a lower computational burden.

For example, the signal processing module 210 may include a downmixing module (not shown). The downmixing module may, for example, generate audio data representative of a binaural stereo signal from a 5.1-channel or 7.1-channel surround sound signal. The corresponding computationally-simpler module in the additional processing module 510, 720 may, instead of performing "full" downmixing on the second filtered data, simply discard all channels except the front-left and front-right channels of the 5.1-channel or 7.1-channel surround sound signal.

The additional processing module 510, 720 may comprise a respective computationally-simpler module corresponding to each and every module of the signal processing module 210. The specific configuration of the various computationally-simpler modules is not essential; various alternatives will be readily apparent to those of ordinary skill in the art.

C. EXAMPLE IMPLEMENTATION ARCHITECTURE

In various embodiments, the techniques described herein are implemented by one or more apparatus, such as one or more special-purpose computing devices. In at least one embodiment, one or more such special-purpose computing devices may be connected together and/or to other computing devices.

Figure 9:
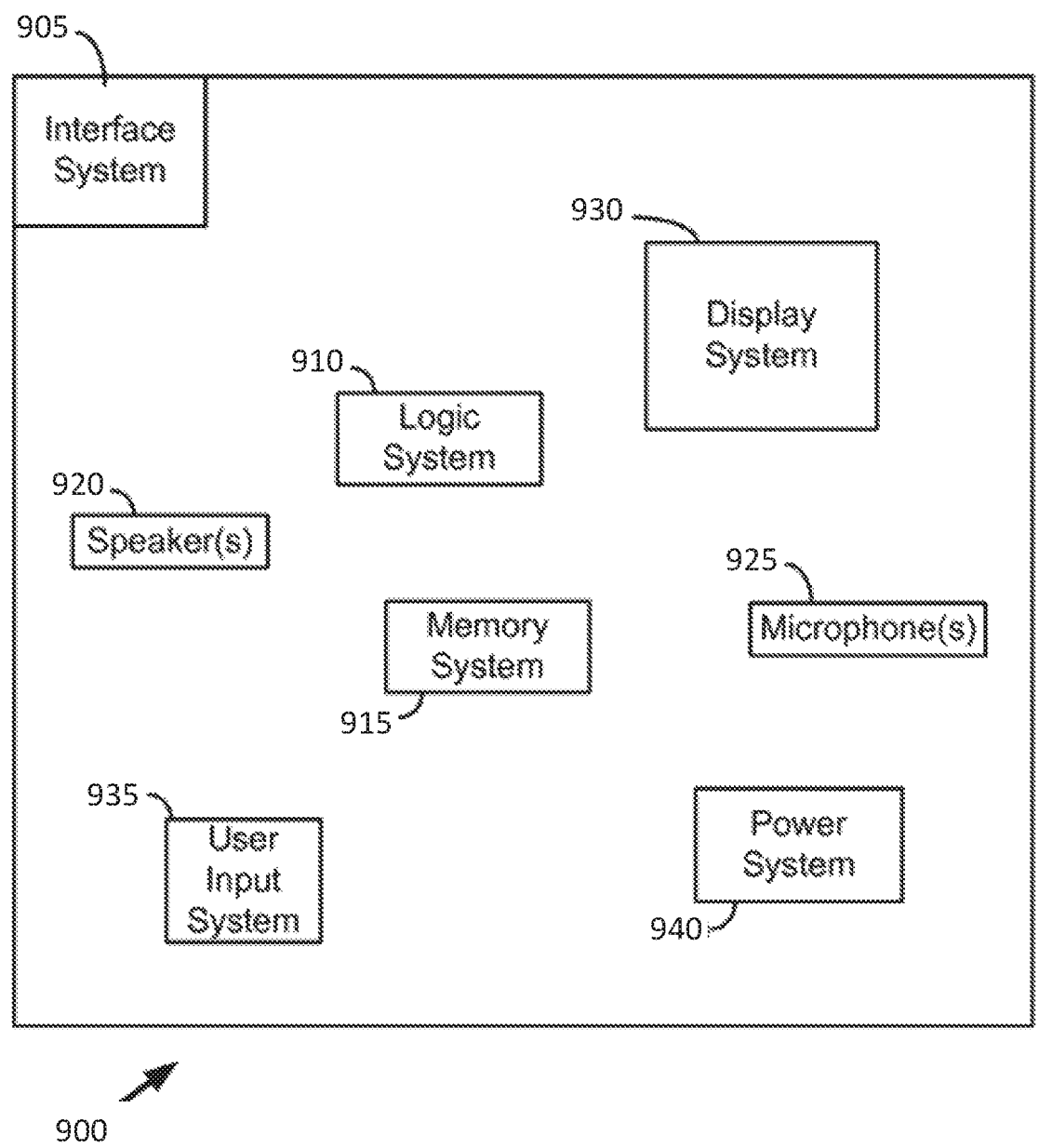
FIG. 9 is a schematic diagram showing an example implementation suitable for the first and second embodiments, and other embodiments.

FIG. 9 is a block diagram that shows examples of components of such a special-purpose computing device 900. In this example, the computing device 900 includes an interface system 905. The interface system 905 may include a network interface, such as a wireless network interface. Alternatively, or additionally, the interface system 905 may include a universal serial bus (USB) interface or another such interface.

The device 900 includes a logic system 910. The logic system 910 may include a processor, such as a general purpose single- or multi-chip processor. The logic system 910 may include a digital signal processor (DSP), an application specific integrated circuit (ASIC), a field programmable gate array (FPGA) or other programmable logic device, discrete gate or transistor logic, or discrete hardware components, or combinations thereof. The logic system 910 may be configured to control the other components of the device 900. Although no interfaces between the components of the device 900 are shown in FIG. 9, the logic system 910 may be configured with interfaces for communication with the other components. The other components may or may not be configured for communication with one another, as appropriate.

The logic system 910 may be configured to perform audio processing functionality, including but not limited to the techniques described herein. In some such implementations, the logic system 910 may be configured to operate (at least in part) according to software, such as a computer program, stored one or more non-transitory media. The non-transitory media may include memory associated with the logic system 910, such as random access memory (RAM) and/or read-only memory (ROM). The non-transitory media may include memory of the memory system 915. The memory system 915 may include one or more suitable types of non-transitory storage media, such as flash memory, a hard drive, etc.

The display system 930 may include one or more suitable types of display, depending on the manifestation of the device 900. For example, the display system 930 may include a liquid crystal display, a plasma display, a bistable display, etc.

The user input system 935 may include one or more devices configured to accept input from a user. In some implementations, the user input system 935 may include a touch screen that overlays a display of the display system 930. The user input system 935 may include a mouse, a track ball, a gesture detection system, a joystick, one or more GUIs and/or menus presented on the display system 930, buttons, a keyboard, switches, etc. In some implementations, the user input system 935 may include the microphone 925: a user may provide voice commands for the device 900 via the microphone 925. The logic system may be configured for speech recognition and for controlling at least some operations of the device 900 according to such voice commands.

The power system 940 may include one or more suitable energy storage devices, such as a nickel-cadmium battery or a lithium-ion battery. The power system 940 may be configured to receive power from an electrical outlet.

EQUIVALENTS, EXTENSIONS, ALTERNATIVES AND MISCELLANEOUS

Further embodiments of the present disclosure will become apparent to a person skilled in the art after studying the description above.

For example, in further embodiments, one type of filter bank may be used to convert the audio data of the first sampling rate into the frequency domain before performing the signal processing on it, and applying filtering to the second-sampling-rate audio data may comprise applying a different type of filter bank instead of applying an adapted version of the same filter bank, provided that the resulting bands of frequency domain audio data are still in a format that the signal processing module 210 can operate on.

Additionally or alternatively, in further embodiments, the filter bank generates a first number of bands of frequency data and the adapted version thereof generates a second number of bands of frequency data, the second number being higher than the first number, the ratio of the first number to the second number being less than the ratio of the first sampling rate to the second sampling rate. In such embodiments, the signal processing module 210, or module upstream thereof, is configured to perform decimation on the bands of frequency data (because the sampling rate of the bands of frequency data, prior to decimation, is higher than the first sampling rate). In some embodiments, the first signal processing is sampling-rate agnostic (none of the constituent signal processing depends on the sampling rate of the data being processed), and so no decimation is required.

Additionally or alternatively, in further embodiments, the filter bank generates a first number of bands of frequency data and the adapted version thereof generates a second number of bands of frequency data, the second number being higher than the first number, the ratio of the first number to the second number being higher than the ratio of the first sampling rate to the second sampling rate. In such embodiments, the signal processing module 210, or module upstream thereof, is configured to perform interpolation on the bands of frequency data (because the sampling rate of the bands of frequency data, prior to decimation, is lower than the first sampling rate). In some embodiments, the first signal processing is sampling-rate agnostic (none of the constituent signal processing depends on the sampling rate of the data being processed), and so no interpolation is required.

Additionally or alternatively, in further embodiments, instead of applying a dynamic gain based on a dynamic gain of the first signal processing, the second signal processing may comprise applying a dynamic gain by analyzing the data generated by the first signal processing in order to thereby find a gain which, when applied as part of the second signal processing, results in a properly aligned spectrum of the combined (process) first and second filtered audio data.

Even though the present description and drawings disclose embodiments and examples, the disclosure is not restricted to these specific examples. Numerous modifications and variations can be made without departing from the scope of the present disclosure, which is defined by the accompanying claims.

Any reference signs appearing in the claims are not to be understood as limiting their scope.

Additionally, variations to the disclosed embodiments can be understood and effected by the skilled person in practicing the disclosure, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method in an apparatus, the apparatus being configured to perform signal processing on audio data of a first sampling rate, wherein the apparatus is configured to use a filter bank to convert the audio data of the first sampling rate into the frequency domain before performing the signal processing on the audio data of the first sampling rate, the method comprising:
receiving audio data of a second sampling rate, the second sampling rate being higher than the first sampling rate;
applying filtering to the audio data of the second sampling rate to thereby produce first filtered audio data and second filtered audio data, the first filtered audio data comprising mainly component frequencies in the range which is audible to the human ear, the second filtered audio data comprising mainly component frequencies above the range which is audible to the human ear;
applying first signal processing to the first filtered audio data, wherein said applying first signal processing comprises applying at least one of: dialog enhancement, volume levelling or equalization; and
applying second signal processing to the second filtered audio data, the second signal processing having a lower computational complexity than the first signal processing,
wherein said applying filtering to the audio data of the second sampling rate comprises applying an adapted version of the filter bank to the audio data of the second sampling rate,
wherein the filter bank is configured to generate a first number of bands of frequency-domain audio data and the step of applying the adapted version of the filter bank generates a second number of bands of frequency-domain audio data, the second number being higher than the first number, the ratio of the first number of bands to the second number of bands being the same as the ratio of the first sampling rate to the second sampling rate.

2. The method of claim 1 wherein the filter bank comprises a first number of filters and the adapted version thereof comprises a second number of filters, the second number being higher than the first number, the ratio of the first number of filters to the second number of filters being the same as the ratio of the first sampling rate to the second sampling rate.

3. The method of claim 1 wherein said applying first signal processing to the first filtered audio data makes use of at least one existing process or step of the signal processing performed on the audio data of the first sampling rate.

4. The method of claim 1 wherein the filter bank receives a first number of samples of the audio data of the first sampling rate and the adapted version thereof receives a second number of samples of the audio data of the second sampling rate, the second number being higher than the first number, the ratio of the first number of samples to the second number of samples being the same as the ratio of the first sampling rate to the second sampling rate.

5. The method of claim 1 wherein the filter bank and the adapted version thereof are decimated filter banks having first and second decimation factors, respectively, the second decimation factor being higher than the first decimation factor, the ratio of the first decimation factor to the second decimation factor being the same as the ratio of the first sampling rate to the second sampling rate.

6. The method of claim 1 wherein said second signal processing comprises applying a dynamic gain based on a dynamic gain of the first signal processing.

7. The method of claim 1 wherein said second signal processing comprises a computationally-simpler version of a step or process of said first signal processing.

8. The method of claim 1 wherein said applying second signal processing does not include any of: dialog enhancement, volume levelling or equalization.

9. The method of claim 1 wherein said applying second signal processing to the second filtered audio data comprises time-domain signal processing of the second filtered audio data.

10. The method of claim 1 wherein the first sampling rate is one of 44.1 kHz or 48 kHz.

11. The method of claim 1 wherein the second sampling rate is one of 88.2 kHz, 96 kHz, 176.4 kHz or 192 kHz.

12. The method of claim 1 wherein the second signal processing comprises introducing a delay to compensate for a delay introduced by the first signal processing.

13. An apparatus comprising:
an input for receiving audio data of a first sampling rate and audio data of a second sampling rate; and
a logic system configured to perform a method according to claim 1.

14. A non-transitory computer readable medium comprising software instructions, which, when executed by a logic system, configure the logic system to perform a method according to claim 1.

15. The method of claim 1 wherein all of the bands of frequency-domain audio data have the same bandwidth.

* * * * *